United States Patent
Yamaoka et al.

(10) Patent No.: US 8,823,834 B2
(45) Date of Patent: Sep. 2, 2014

(54) IMAGE PROCESSING DEVICE FOR DETECTING A FACE OR HEAD REGION, A CLOTHING REGION AND FOR CHANGING THE CLOTHING REGION

(75) Inventors: Keisuke Yamaoka, Tokyo (JP); Jun Yokono, Tokyo (JP); Yuichi Hasegawa, Tokyo (JP)

(73) Assignee: Sony Corporation, Tokyo (JP)

(*) Notice: Subject to any disclaimer, the term of this patent is extended or adjusted under 35 U.S.C. 154(b) by 94 days.

(21) Appl. No.: 13/071,009

(22) Filed: Mar. 24, 2011

(65) Prior Publication Data
US 2011/0273592 A1 Nov. 10, 2011

(30) Foreign Application Priority Data
May 7, 2010 (JP) .................. 2010-107147

(51) Int. Cl.
*G06K 9/00* (2006.01)
*G06K 9/34* (2006.01)
*G06T 7/00* (2006.01)
*G06T 11/60* (2006.01)
*G06K 9/46* (2006.01)

(52) U.S. Cl.
CPC .............. *G06T 11/60* (2013.01); *G06T 7/0081* (2013.01); *G06K 9/00221* (2013.01); *G06K 9/00234* (2013.01); *G06K 9/00362* (2013.01); *G06K 9/469* (2013.01); *G06K 9/00577* (2013.01); *G06T 2201/30201* (2013.01)
USPC ............ 348/239; 382/111; 382/168; 382/173

(58) Field of Classification Search
CPC .. G06T 11/60; G06T 7/0081; G06K 9/00577; G06K 9/00221; G06K 9/00234; G06K 9/00362; G06K 9/469
USPC ............................................ 348/239; 382/111
See application file for complete search history.

(56) References Cited

U.S. PATENT DOCUMENTS

| 4,668,065 A | * | 5/1987 | Tanaka et al. | 396/358 |
| 4,899,187 A | * | 2/1990 | Alligood | 396/358 |
| 5,659,490 A | * | 8/1997 | Imamura | 358/500 |
| 5,719,639 A | * | 2/1998 | Imamura | 348/577 |
| 2007/0071311 A1 | * | 3/2007 | Rovira-Mas et al. | 382/154 |

(Continued)

FOREIGN PATENT DOCUMENTS

JP 2010-108476 5/2010

OTHER PUBLICATIONS

"Personal Color Coordinating System," http://www.ipsj.or.jp/sig/os/index.php?plugin=attach&refer=ComSys2006%2Fposter&openfile=06-P10.pdf>, Nov. 29, 2006, 2 pages.

(Continued)

*Primary Examiner* — Aung S Moe
*Assistant Examiner* — Amy Hsu
(74) *Attorney, Agent, or Firm* — Oblon, Spivak, McClelland, Maier & Neustadt, L.L.P.

(57) ABSTRACT

An image processing device includes a clothing extractor extracting a face or head portion from an input image, the face or head portion being a region estimated to be a face or head image, and extracting a clothing region from a region immediately below the face or head portion, the clothing region being a region estimated to be a clothing image, and a clothing converter changing clothing in the input image by performing predetermined image processing on an image in the clothing region in the input image.

13 Claims, 10 Drawing Sheets

(56) References Cited

U.S. PATENT DOCUMENTS

| | | | |
|---|---|---|---|
| 2007/0237364 A1* | 10/2007 | Song et al. | 382/115 |
| 2008/0136895 A1* | 6/2008 | Mareachen | 348/14.03 |
| 2008/0298643 A1* | 12/2008 | Lawther et al. | 382/118 |
| 2009/0144173 A1* | 6/2009 | Mo et al. | 705/27 |
| 2009/0263038 A1* | 10/2009 | Luo et al. | 382/254 |
| 2010/0111370 A1* | 5/2010 | Black et al. | 382/111 |
| 2010/0166339 A1* | 7/2010 | Gokturk et al. | 382/305 |
| 2010/0214442 A1* | 8/2010 | Uemura et al. | 348/231.2 |
| 2010/0266159 A1* | 10/2010 | Ueki et al. | 382/103 |
| 2011/0310289 A1* | 12/2011 | Veksland et al. | 348/345 |

OTHER PUBLICATIONS

Navneet Dalal, et al., "Histograms of Oriented Gradients for Human Detection", CVPR, 2005, 8 pages.

Deva Ramanan, "Learning to parse images of articulated bodies", NIPS, 2006, 8 pages.

* cited by examiner

IMAGE PROCESSING DEVICE FOR DETECTING A FACE OR HEAD REGION, A CLOTHING REGION AND FOR CHANGING THE CLOTHING REGION

BACKGROUND OF THE INVENTION

1. Field of the Invention

The present invention generally relates to an image processing device, image processing method, and program, and in particular to an image processing device, image processing method, and program that enable easy change of clothing in an image.

2. Description of the Related Art

In recent years, digital cameras and other imaging devices are in widespread use and anyone can easily capture still images and moving images.

On the other hand, decorating photographic images for enjoyment as typified with photograph stickers created by a photograph sticker production machine called "Print Club" is in fashion.

There are various restrictions, however, in decorating photographic images in photograph stickers. For example, it is necessary to use a photograph sticker production machine specialized for photograph stickers and to place the user's face or body at a predetermined position when an image is captured.

A personal color coordinating system has been proposed which enables clothing in an image input by the user to be changed to any seasonal color specified by the user (see, for example, Mizuki Oka, Junpei Yoshino, Kazuhiko Kato, "Personal Color Coordinating System," Nov. 29, 2006, Information Processing Society of Japan, [retrieved on Jan. 18, 2010], Internet <URL: http://www.ipsj.or.jp/sig/os/index.php?plugin=attach&refer=ComSys2006%2Fposter&openfile=06-P10.pdf>).

SUMMARY OF THE INVENTION

In the personal color coordinating system described above, to extract a clothing image region from an input image, the user should specify a region corresponding to the trunk portion in the input image.

There is a demand therefore for automatic extraction of a clothing image region from an image and easy change of clothing in the image.

It is desirable that clothing in an image can be changed with ease.

An image processing device according to an embodiment of the present invention includes a clothing extractor extracting from an input image a face or head portion, which is a region estimated to be a face or head image, and extracting from the region immediately below the face or head portion a clothing region, which is a region estimated to be a clothing image, and a clothing converter changing clothing in the input image by performing predetermined image processing on an image in the clothing region in the input image.

An image processing method and program according to other embodiments of the present invention correspond to the image processing device according to the embodiment of the present invention described above.

According to the embodiments of the present invention, a face or head portion is extracted from an input image, the face or head portion being a region estimated to be a face or head image, a clothing region is then extracted from a region immediately below the face or head portion, the clothing region being a region estimated to be a clothing image, and predetermined image processing is performed on an image in the clothing region in the input image, so that the clothing in the input image is changed.

According to the embodiments of the present invention, clothing in an image can be easily changed.

DESCRIPTION OF THE PREFERRED EMBODIMENTS

Embodiment

Exemplary Structure of an Imaging Device According to an Embodiment

Figure 1:
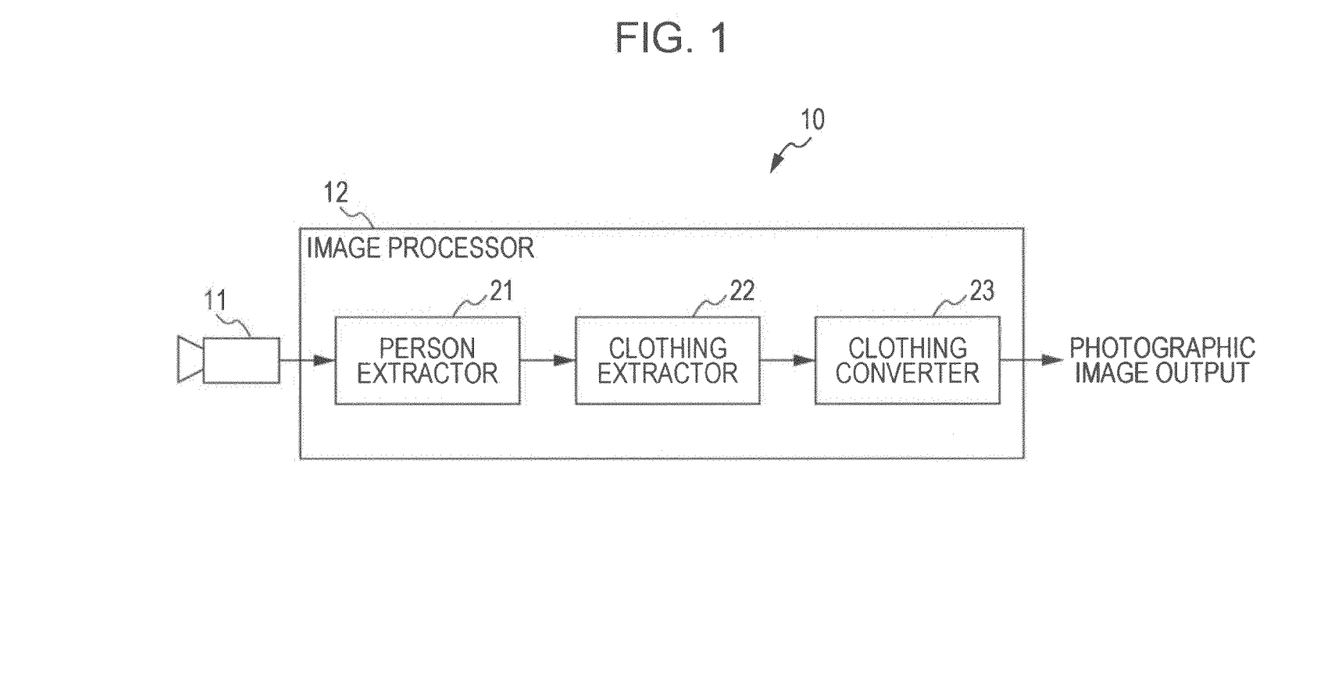
FIG. 1 is a block diagram showing an exemplary structure of an imaging device according to an embodiment of the present invention.

FIG. 1 is a block diagram showing an exemplary structure of an imaging device according to an embodiment of the present invention.

The imaging device 10 in FIG. 1 includes an image capturer 11 and an image processor 12 (image processing device).

The image capturer 11 captures an image of the subject and supplies the captured photographic image to the image processor 12.

The image processor 12 includes a person extractor 21, clothing extractor 22, and clothing converter 23.

The person extractor 21 performs a person extracting process to extract a person region, which is a region estimated to be a person image, from a photographic image (input image) supplied from the image capturer 11. Techniques available for extracting a person region include the recognition technique using the Boosting process using as the feature values the response from the steerable filter as described in Japanese Patent Application No. 2009-055062 filed by the applicant of the present invention and the recognition technique using the support vector machine (SVM) and the histograms of oriented gradients (HOG) feature values proposed by N. Dalal et al., INRIA, France (see "Histograms of Oriented Gradients for Human Detection", CVPR, 2005). The person extractor 21 supplies the photographic image and person region information specifying the person region extracted by the person extracting process to the clothing extractor 22.

The clothing extractor 22 performs a clothing extracting process to extract a clothing region, which is a region estimated to be a clothing image, from the person region in the photographic image corresponding to the person region information supplied from the person extractor 21. The clothing extractor 22 supplies to the clothing converter 23 the photographic image and clothing region information specifying the clothing region extracted by the clothing extracting process.

Information indicating the pixel positions in the person or clothing region in the photographic image, for example, is used as the information for specifying the person or clothing region.

On the basis of the clothing region information supplied from the clothing extractor 3, the clothing converter 23 changes clothing in the photographic image by performing various types of image processing on the clothing region in the photographic image.

For example, the clothing converter 23 changes the color of an image in the clothing region in the photographic image. The clothing converter 23 also creates a mask for merging an image into only the clothing region in the person region and performs noise reduction and shaping of the mask using a morphing process such as expansion, reduction, or the like or a small region removing process by labeling, for example. The clothing converter 23 uses the resultant mask to merge a pre-stored image for decoration (referred to hereinafter as decorative image) into the image in the clothing region in the photographic image. After this image processing, the clothing converter 23 outputs the resultant photographic image to the outside such as a display device.

One or more decorative images may be pre-stored. If a plurality of decorative images are pre-stored, the decorative image to be merged may be selected by the user, for example. Plain or patterned textures or mark or character images, for example, can be used as the decorative images.

Person Extracting Process

Figure 2:
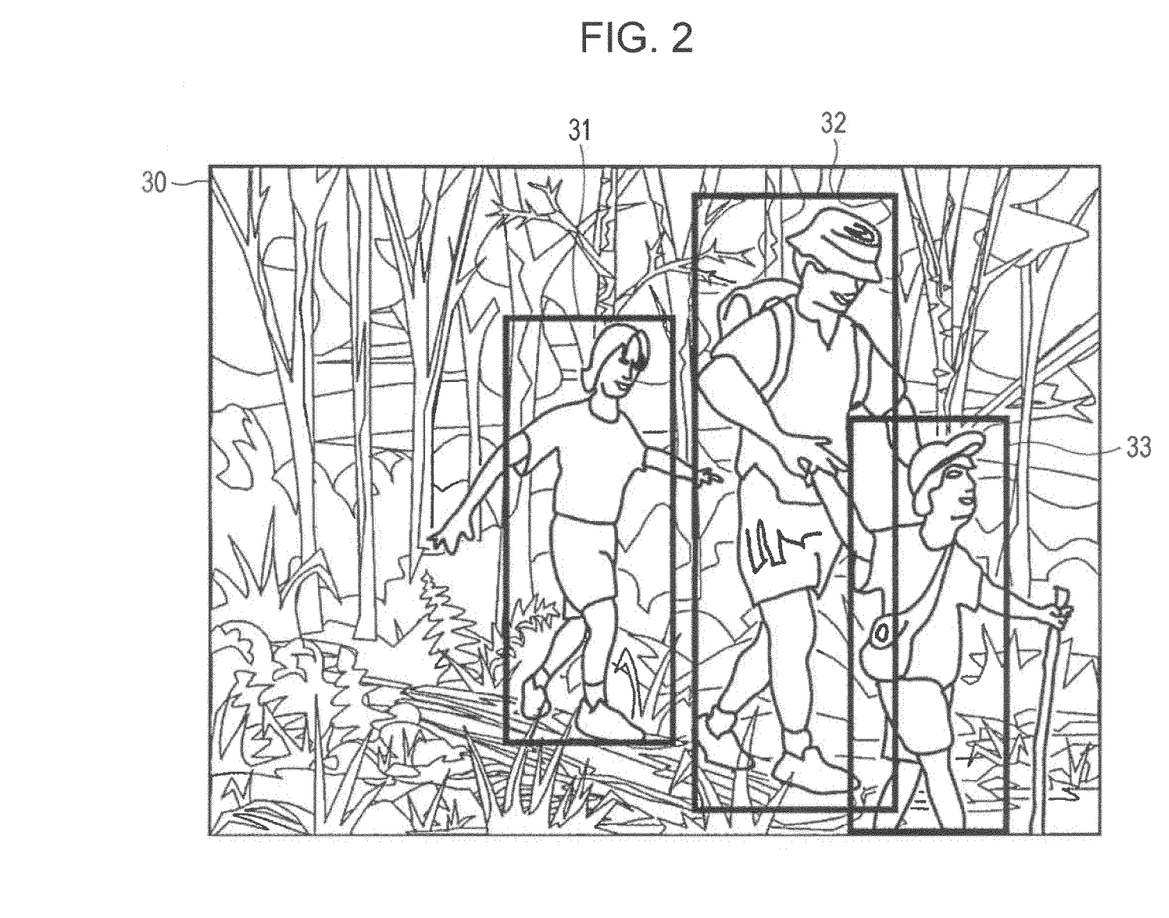
FIG. 2 illustrates the result of a person extracting process performed by the person extractor in FIG. 1.

FIG. 2 illustrates the result of the person extracting process by the person extractor in FIG. 1.

When a photographic image 30 including generally the whole bodies of a father, a mother, and a child as shown in FIG. 2 is input from the image capturer 11, rectangular regions 31, 32, and 33 including images of the whole bodies of the mother, father, and the child, respectively, are extracted as the person regions in the person extracting process.

Mask

Figure 3:
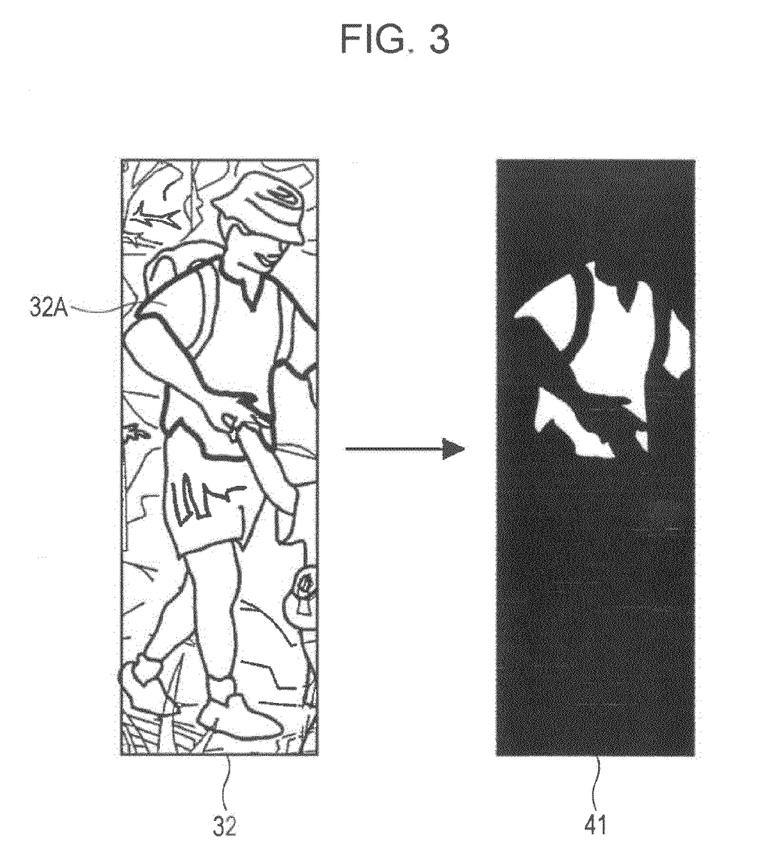
FIG. 3 illustrates a mask created by the clothing converter in FIG. 1.

FIG. 3 illustrates a mask created by the clothing converter 23 in FIG. 1.

When clothing region information specifying as the clothing region a region 32A of an outerwear image in the region 32 is supplied from the clothing extractor 22, the clothing converter 23 creates a mask 41 for merging an image into only the clothing region 32A in the region 32 as shown in FIG. 3.

Merging of Decorative Image into Clothing Region

Figure 4A:
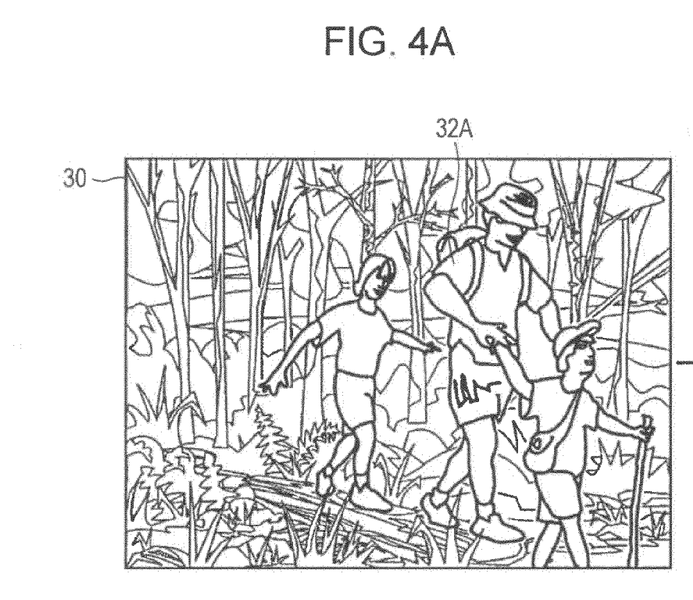
FIGS. 4A and 4B illustrate the merging of a decorative image by the clothing converter in FIG. 1.
Figure 4B:
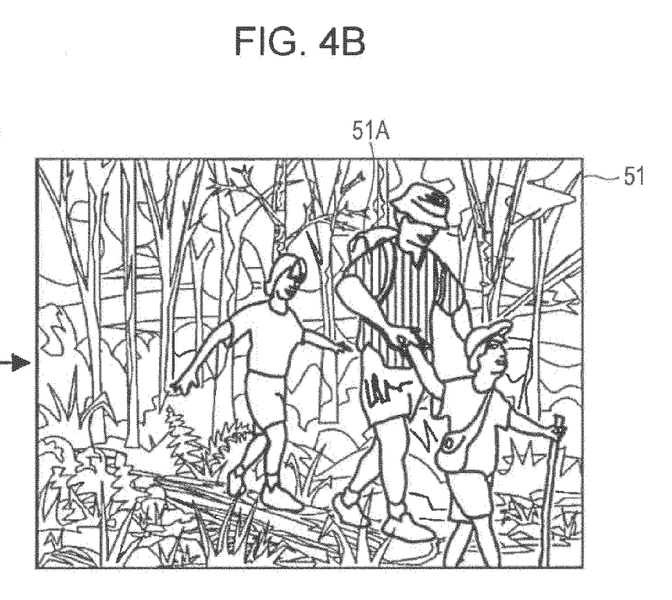

FIGS. 4A and 4B illustrate the merging of a decorative image by the clothing converter 23 in FIG. 1.

The clothing converter 23 uses the mask 41 shown in FIG. 3 to merge a decorative image 51A into the image in the clothing region 32A in the photographic image 30 shown in FIG. 4A. Consequently, a photographic image 51 is generated as shown in FIG. 4B in which the image in the clothing region 32A in the photographic image 30 has been changed to the decorative image 51A. In the example in FIGS. 4A and 4B, the decorative image 51A is a striped texture and the pattern of the outerwear of the father is changed from plain to a striped pattern.

The clothing of the mother and/or child can also be decorated similarly to the decoration of the father's clothing described with reference to FIGS. 3 to 4B.

Process by Imaging Device

Figure 5:
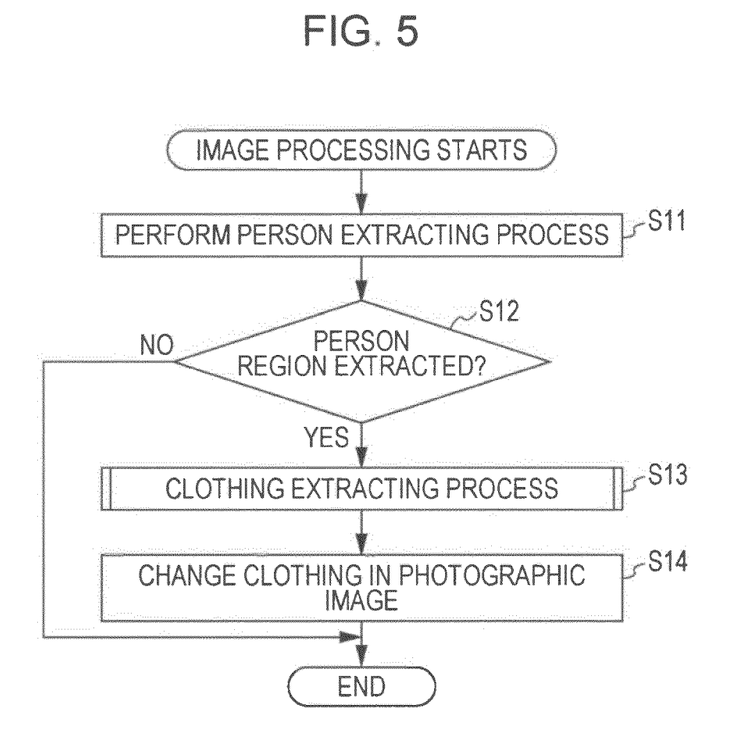
FIG. 5 is a flowchart illustrating the image processing performed by the image processor in FIG. 1.

FIG. 5 is a flowchart illustrating the image processing by the image processor 12 in FIG. 1. This image processing starts when a photographic image captured by the image capturer 11, for example, is input to the image processor 12.

In step S11, the person extractor 21 performs a person extracting process. In step S12, the person extractor 21 determines whether a person region has been extracted by the person extracting process.

If it is determined in step S12 that the person region has been extracted, the clothing extractor 22 performs in step S13 a clothing extracting process to extract a clothing region from the person region corresponding to the person region information supplied from the person extractor 21. This clothing extracting process will be described below in more detail with reference to FIGS. 6 and 7.

In step S14, the clothing converter 23 changes clothing in the photographic image by performing various types of image processing on the clothing region in the photographic image on the basis of the clothing region information supplied from the clothing extractor 22. After the image processing, the clothing converter 23 outputs the resultant photographic image to the outside such as a display device. Then, the process ends.

On the other hand, if it is determined in step S12 that the person region has not been extracted, steps S13 and S14 are skipped and the photographic image is output as it is to the outside. Then, the process ends.

Figure 6:
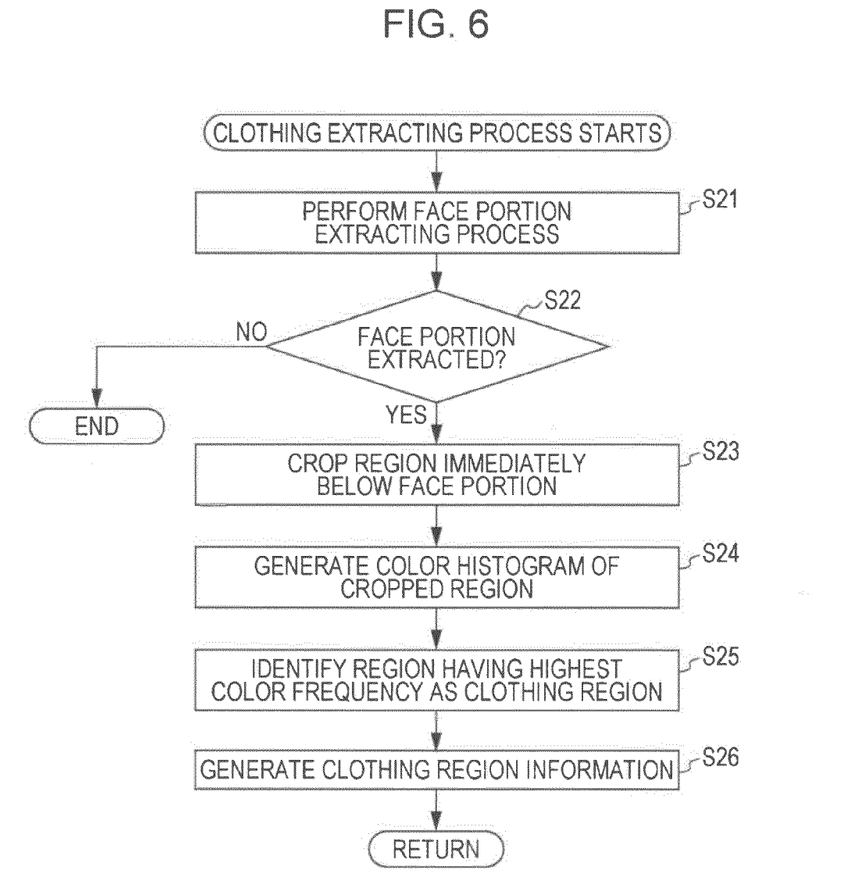
FIG. 6 is a flowchart illustrating an exemplary clothing extracting process.

FIG. 6 is a flowchart illustrating an exemplary clothing extracting process in step S12 in FIG. 5.

In step S21, the clothing extractor 22 performs a face portion extracting process to extract a face portion, which is a region estimated to be a face image, from the person region in the photographic image corresponding to the person region information supplied from the person extractor 21.

In step S22, the clothing extractor 22 determines whether the face portion has been extracted in step S21. If it is determined in step S22 that the face portion has been extracted, the clothing extractor 22 crops (cuts out) in step S23 a region immediately below the face portion from the photographic image.

In step S24, the clothing extractor 22 generates a color histogram of the photographic image in the cropped region. In step S25, the clothing extractor 22 identifies as the clothing region a region in the cropped region having the highest color frequency in the histogram generated in step S24. In step S26, the clothing extractor 22 generates clothing region information indicating the positions in the photographic image of the pixels included in the identified clothing region. Then, the process returns to step S13 in FIG. 5 and proceeds to step S14.

On the other hand, if it is determined in step S22 that the face portion has not been extracted, the process ends.

In the clothing extracting process described above with reference to FIG. 6, the clothing region is identified on the basis of the color histogram; alternatively, the clothing region may be identified on the basis of a brightness histogram.

Figure 7:
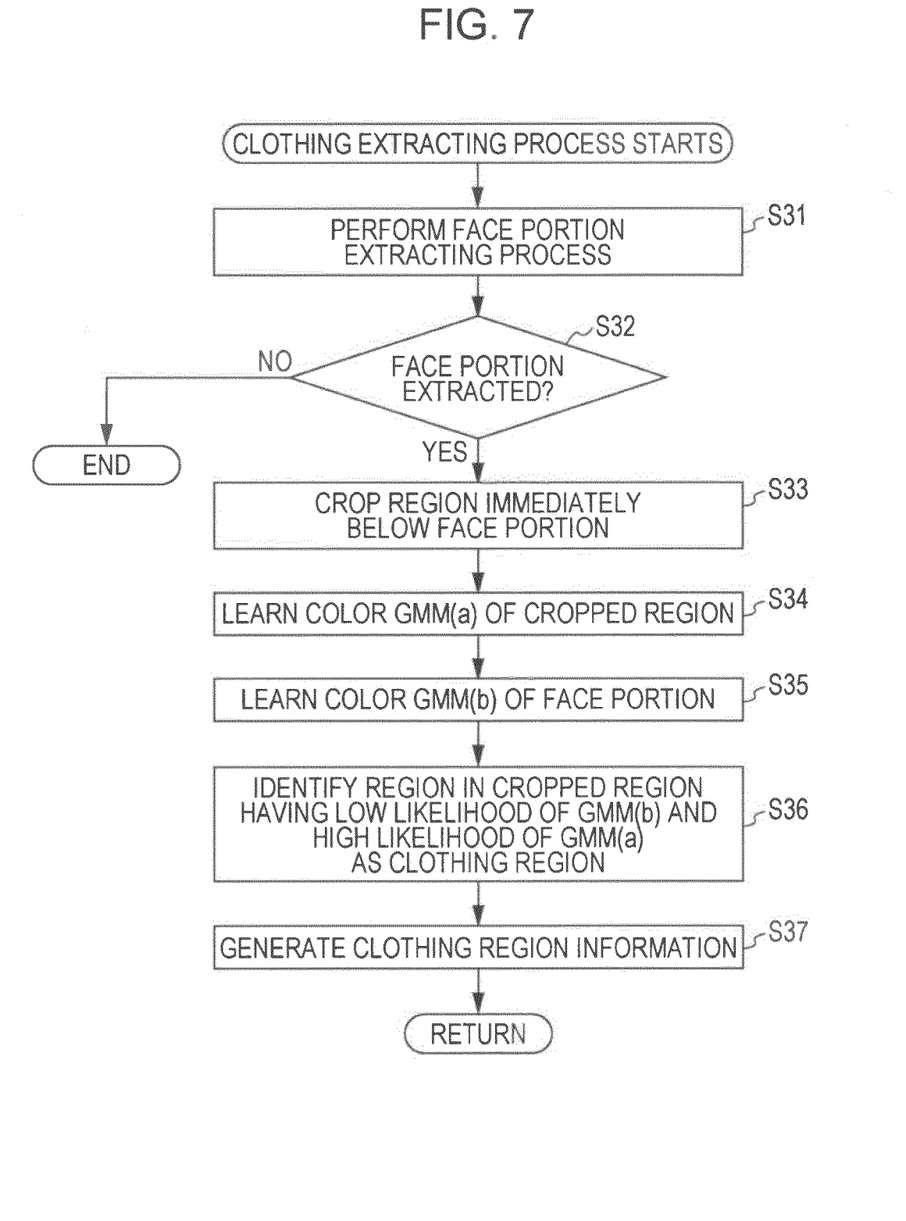
FIG. 7 is a flowchart illustrating another exemplary clothing extracting process.

FIG. 7 is a flowchart illustrating another exemplary clothing extracting process in step S13 in FIG. 5.

Steps S31 to S33 in FIG. 7 are identical to steps S21 to S23 in FIG. 6, so description thereof is omitted.

In step S34, which follows step S33, the clothing extractor 22 learns the gaussian mixture model (GMM) of the color of the photographic image in the cropped region as GMM(a). In step S35, the clothing extractor 22 learns the GMM of the color of the photographic image in the face portion as GMM (b).

In step S36, the clothing extractor 22 identifies as the clothing region an area in the cropped region having a low GMM(b) likelihood and a high GMM(a) likelihood. In step S37, the clothing extractor 22 generates clothing region information indicating the positions in the photographic image of the pixels included in the identified clothing region. The process then returns to step S13 in FIG. 5 and proceeds to step S14.

In the clothing extracting process described above with reference to FIGS. 6 and 7, the clothing extractor 22 performs a face portion extracting process and crops the region immediately below the face portion; alternatively, the clothing extractor 22 may perform a head portion extracting process to extract a head portion, which is a region estimated to be a head image, and crop the region immediately below the head portion.

Alternatively, the clothing extractor 22 may estimate the pose of the person using, for example, the technique developed by D. Ramanan at Toyota Technological Institute at Chicago as described in "Learning to Parse Images of Articulated Bodies", NIPS, 2006 and crop the upper body portion of that person.

Alternatively, the clothing extractor 22 may crop the predetermined region (for example, upper region) of the person region. If the person's upper body region is extracted as the person region in the person extracting process, the clothing extractor 22 may crop the person region itself.

The clothing extracting process is not limited to the processing described with reference to FIGS. 6 and 7. For example, the clothing extractor 22 may extract textural feature values (for example, wavelet coefficient, color histogram, brightness histogram, or the like) of a small region near the center of a region that is cropped in a similar manner as in the clothing extracting process in FIGS. 6 and 7, and perform segmentation using the textural feature values and determine the clothing region.

Exemplary Segmentation Processes

Figure 8A:
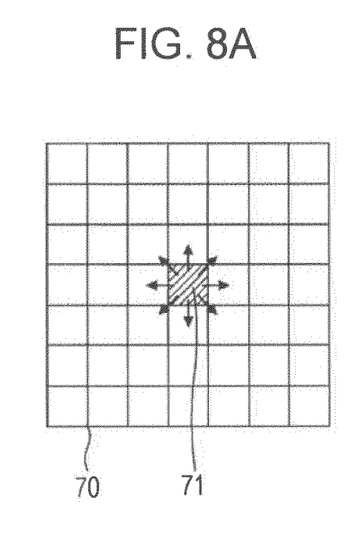
FIGS. 8A to 8D illustrate a region growing process.
Figure 8B:
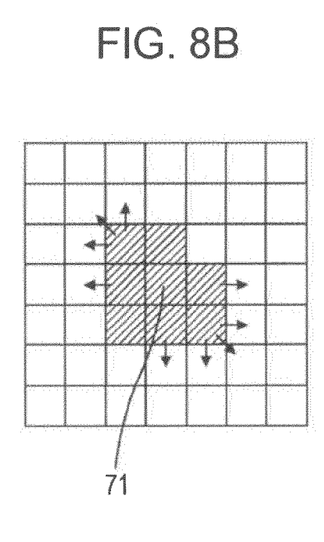
Figure 8C:
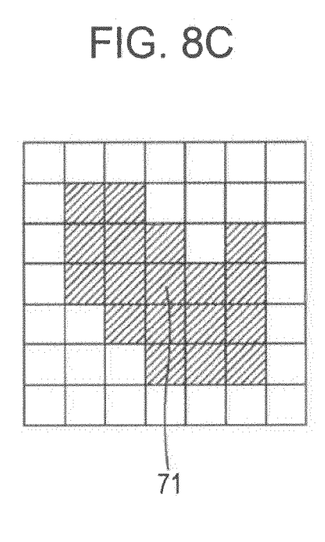
Figure 8D:
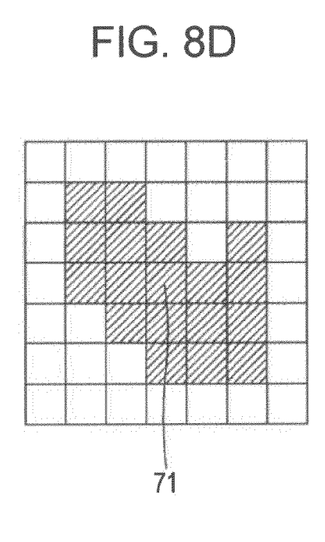
Figure 9:
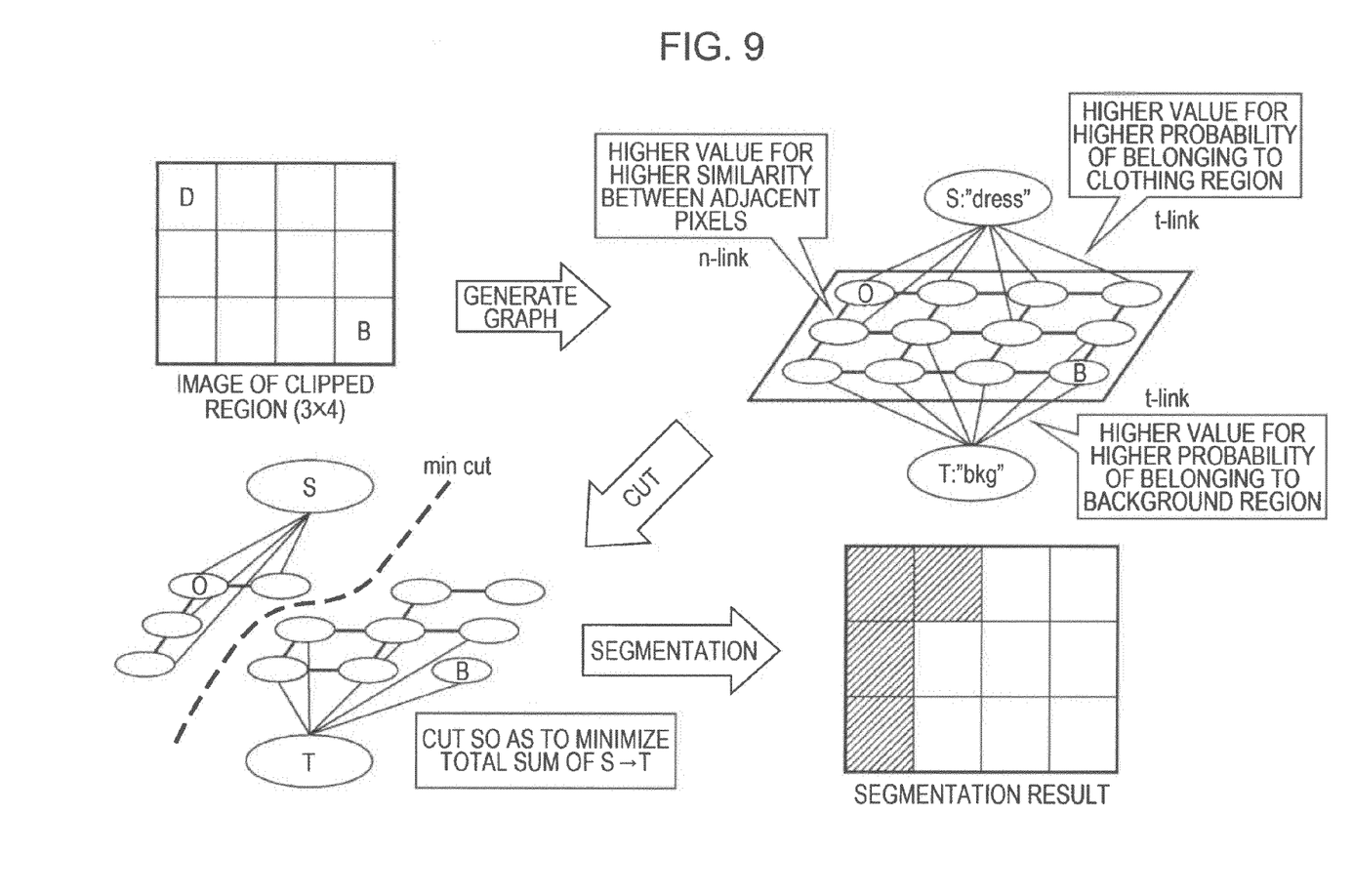
FIG. 9 illustrates a graph cut process.

FIGS. 8A to 9 illustrate exemplary segmentation processes used to determine a clothing region.

FIGS. 8A to 8D illustrate a region growing process.

When the region growing process is used to determine a clothing region, the clothing extractor 22 first labels as the seed point a pixel 71 located in a small region adjacent to the center of a cropped region 70 as shown in FIG. 8A. The clothing extractor 22 then extracts a textural feature value of the pixel 71. In FIGS. 8A to 8D, the squares in the region 70 represent pixels and the labeled pixels are diagonally shaded.

Next, as shown in FIG. 8B, the clothing extractor 22 assigns the same label as the pixel 71 to the pixels that are adjacent to the pixel 71 and have the same textural feature value as the pixel 71. Label assignment continues until pixels having the same textural feature value as the pixel 71 are no longer found near the labeled pixels. In the example in FIGS. 8A to 8D, after the pixel 71 is labeled as shown in FIG. 8A, label assignment is repeated three times as shown in FIGS. 8B to 8D.

The clothing extractor 22 then identifies as the clothing region a region made up of the labeled pixels (in the example in FIGS. 8A to 8D, pixels obliquely shaded in FIG. 8D) in the cropped region 70.

FIG. 9 illustrates a graph cut process.

If the graph cut process is used to determine a clothing region, the clothing extractor 22 first generates a graph from the image of a clipped region (in the example in FIG. 9, image of 3×4 pixels) on the basis of a predetermined energy function. The clothing extractor 22 then calculates the costs of the edges in the graph. The n-link edge cost increases as the degree of similarity between the adjacent pixels is higher, while the edge cost of the t-link connecting to the S node increases as the pixel has higher probability of belonging to the clothing region. The edge cost of the t-link connecting to the T node increases as the pixel has higher probability of belonging to a background region outside the clothing region.

The clothing extractor 22 then performs segmentation by cutting the graph according to a min-cut/max-flow algorithm so that the total sum of the costs from the S node to the T node is minimized. With this, in the graph resulting from the cutting, the region made up of the pixels corresponding to the nodes connecting to the S node is determined to be the clothing region.

As described above, the imaging device 10 can automatically and easily extract the clothing region by extracting the face or head portion from the photographic image and extracting the clothing region from the region immediately below the face or head portion. The imaging device 10 can therefore easily change the clothing in the photographic image by performing predetermined image processing on the clothing region in the photographic image.

The image capturer and image processor may be implemented as different devices or as a single device. When the image capturer and the image processor are implemented as a single device, the clothing in the photographic image can be easily changed in an image capturing device (for example, personal camera or the like) without the use of a specialized device.

Computer According to an Embodiment of the Present Invention

A series of processing steps performed by the above image processor 12 can be implemented by hardware or software. When the processing steps are implemented by software, the program forming this software is installed into a general-purpose computer or the like.

Figure 10:
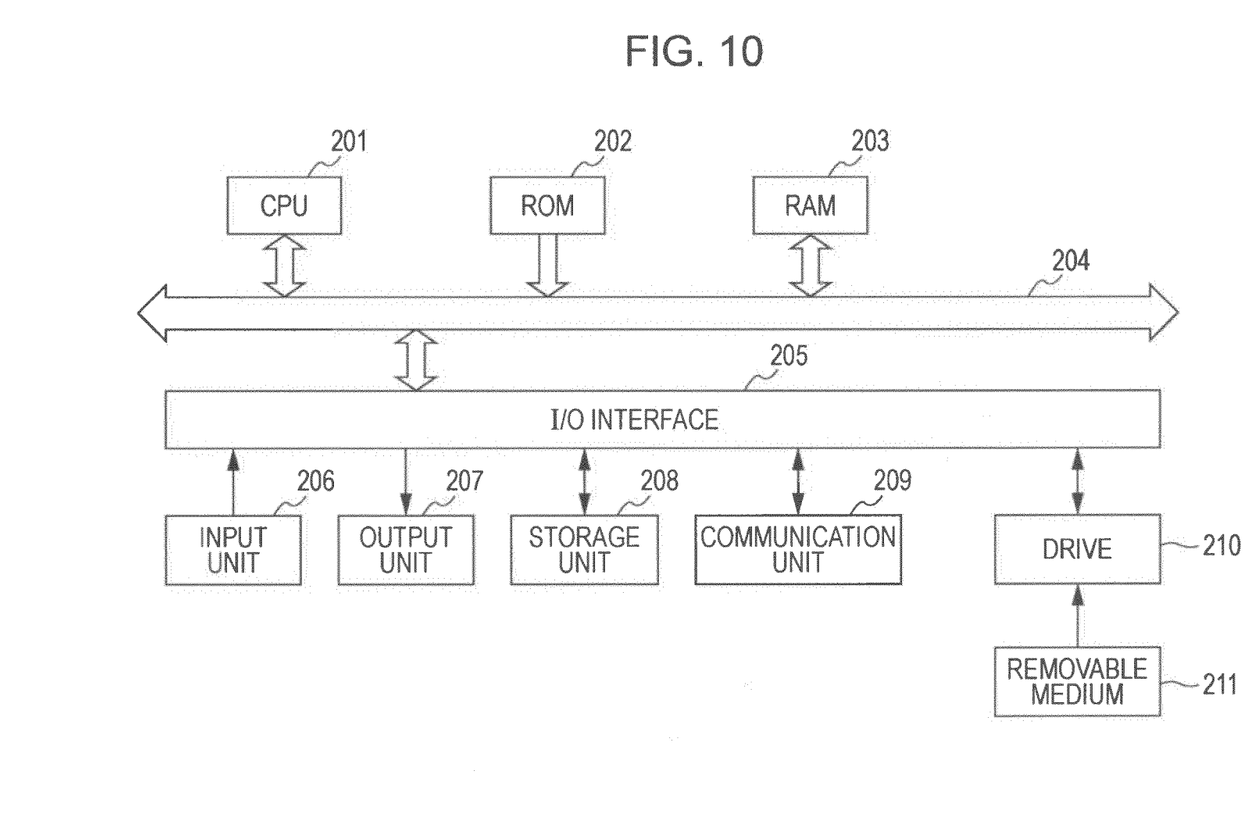
FIG. 10 shows an exemplary structure of a computer according to an embodiment.

FIG. 10 shows an exemplary structure of a computer according to an embodiment into which the program for the above processing steps performed by the image processor 12 is installed.

The program can be pre-stored in a storage medium built in the computer, such as a storage unit 208 or read only memory (ROM) 202.

Alternatively, the program can be stored (recorded) in a removable medium 211. Such a removable medium 211 can be provided as the so-called package software. Examples of removable medium 211 include, for example, a flexible disk, compact disc read only memory (CD-ROM), magneto optical (MO) disk, digital versatile disc (DVD), magnetic disk, and semiconductor memory.

Instead of being installed into the computer via a drive 210 from the removable medium 211 as described above, the program can also be downloaded via a communication or broadcasting network to the computer and installed into a built-in storage unit 208. More specifically, the program can be transmitted to the computer either wirelessly, for example, from a download site via a satellite for digital satellite broadcasting, or in a wired manner through a network such as a local area network (LAN), Internet, or the like.

The computer has a built-in central processing unit (CPU) 201 to which an I/O interface 205 is connected via a bus 204.

When a command is input through the I/O interface 205 from an input unit 206 operated by a user, for example, the CPU 201 executes a program stored in the ROM 202 according to this command. Alternatively, the CPU 201 loads a program from the storage unit 208 into the random access memory (RAM) 203 and executes this program.

With this, the CPU 201 performs the processing steps according to the flowchart described above or the processing steps defined by the structure in the block diagram described above. The CPU 201 then outputs the processing results from an output unit 207, transmits the processing results from a communication unit 209, or stores the processing results into a storage unit 208, for example, as necessary, through the I/O interface 205.

The input unit 206 includes a keyboard, mouse, microphone, and/or the like. The output unit 207 includes a liquid crystal display (LCD), loudspeaker, and/or the like.

The order in which the processing steps are performed by the computer according to the program is not limited to the chronological order described in the flowcharts in this specification. In other words, the processing steps to be performed by the computer according to the program may include processing steps performed in parallel or separately (for example, parallel processing or processing by an object).

The program may be processed by a single computer (processor) or by a plurality of distributed computers. The program may be transmitted to and executed by one or more remote computers.

The present application contains subject matter related to that disclosed in Japanese Priority Patent Application JP 2010-107147 filed in the Japan Patent Office on May 7, 2010, the entire contents of which are hereby incorporated by reference.

The present invention is not limited to the embodiments described above and various modifications and changes may be made to the present invention without departing from the scope and spirit of the present invention.

What is claimed is:

1. An image processing device comprising:
   circuitry configured to
      extract a face or head portion from an input image, the face or head portion being a region estimated to be a face or head image,
      crop a region immediately below the face or head portion of the input image,
      generate a color histogram of the region cropped,
      identify a clothing region based on the color histogram, the clothing region being a region estimated to be a clothing image,
      extract the clothing region,
      generate a mask encompassing the clothing image in the clothing region,
      perform a mask modifying process, responsive to generation of the mask, to enlarge, reduce or remove small regions from the mask, and
      change clothing in the mask after the mask modifying process by merging another image with the clothing image in the mask,
   wherein to generate the mask the circuitry is further configured to
      generate a graph of pixels in the clothing region using a predetermined energy function,
      use a predetermined cost function to determine a cost for each pixel relative to adjacent pixels, a cost of each pixel relative to a clothing node and a cost of each pixel relative to a background node,
      use a predetermined algorithm to group the pixels in the clothing region into one of a group of pixels corresponding to the clothing image or a group of pixels corresponding to a background image based on minimization of the sum of costs from the clothing node and the background node, and
      generate the mask to encompass the group of pixels corresponding to the clothing image.

2. The image processing device according to claim 1, wherein the circuitry learns a gaussian mixture model of a color of the region immediately below the face or head portion and a gaussian mixture model of a color of the face or head portion and extracts from the region immediately below the face or head portion a region having a low likelihood of the gaussian mixture model of the color of the face or head portion and a high likelihood of the gaussian mixture model of the region immediately below the face or head portion as the clothing region.

3. The image processing device according to claim 1, wherein the circuitry extracts a textural feature value of a region near the center of the region immediately below the face or head portion and extracts the clothing region by performing segmentation using the textural feature value.

4. The image processing device according to claim 1, wherein the circuitry extracts from the region immediately below the face or head portion a region having a highest color or brightness frequency in a color or brightness histogram of the region immediately below the face or head portion as the clothing region.

5. The image processing device according to claim 1, wherein the circuitry further extracts a person region from the input image, the person region being a region estimated to be a person image, and
   extracts from the person region the face or head portion.

6. The image processing device according to claim 1, wherein the circuitry is further configured to change a color of the clothing image in the mask.

7. The image processing device according to claim 1, wherein the circuitry is further configured to a prestored image into the mask.

8. The image processing device according to claim 1, wherein the circuitry is further configured to perform noise reduction on an image area encompassed by the mask.

9. The image processing device according to claim 1, wherein the image processing device is a digital camera.

10. The image processing device according to claim 1, wherein the circuitry does not extract the clothing region when the face or head portion is not extracted from the input image.

11. The image processing device according to claim 10, wherein the circuitry is further configured to output the input image without processing when the face or head portion is not extracted from the input image.

12. An image processing method comprising:
   extracting, in an image processing device, a face or head portion from an input image, the face or head portion being a region estimated to be a face or head image;
   cropping, in the image processing device, a region immediately below the face or head portion of the input image;
   generating, in the image processing device, a color histogram of the region cropped;
   identifying, in the image processing device, a clothing region based on the color histogram, the clothing region being a region estimated to be a clothing image;
   extracting, in the image processing device, the clothing region;
   generating, in the image processing device, a mask to encompass the clothing image in the clothing region;
   performing a mask modifying process, responsive to generation of the mask, to enlarge, reduce or remove small regions from the mask; and
   changing, in the image processing device and after the mask modifying process, clothing in the mask by merging another image with the clothing image in the mask,
   wherein generating the mask includes
      generating a graph of pixels in the clothing region using a predetermined energy function, using a predetermined cost function to determine a cost for each pixel relative to adjacent pixels, a cost of each pixel relative to a clothing node and a cost of each pixel relative to a background node, using a predetermined algorithm to group the pixels in the clothing region into one of a group of pixels corresponding to the clothing image or a group of pixels corresponding to a background image based on minimization of the sum of costs from the clothing node and the background node, and generating the mask to encompass the group of pixels corresponding to the clothing image.

13. A non-transitory computer-readable medium storing computer-readable instructions thereon, the computer-readable instructions when executed by a computer cause the computer to perform a method comprising:

extracting, in an image processing device, a face or head portion from an input image, the face or head portion being a region estimated to be a face or head image;

cropping a region immediately below the face or head portion of the input image;

generating a color histogram of the region cropped;

identifying a clothing region based on the color histogram, the clothing region being a region estimated to be a clothing image;

extracting the clothing region;

generating a mask to encompass the clothing image in the clothing region;

performing a mask modifying process, responsive to generation of the mask, to enlarge, reduce or remove small regions from the mask; and changing, after the mask modifying process, clothing in the mask by merging another image with the clothing image in the mask, wherein generating the mask includes generating a graph of pixels in the clothing region using a predetermined energy function, using a predetermined cost function to determine a cost for each pixel relative to adjacent pixels, a cost of each pixel relative to a clothing node and a cost of each pixel relative to a background node, using a predetermined algorithm to group the pixels in the clothing region into one of a group of pixels corresponding to the clothing image or a group of pixels corresponding to a background image based on minimization of the sum of costs from the clothing node and the background node, and generating the mask to encompass the group of pixels corresponding to the clothing image.

\* \* \* \* \*